United States Patent [19]

Matsubara

[11] Patent Number: 4,643,541
[45] Date of Patent: Feb. 17, 1987

[54] OPTICAL SYSTEM FOR VARIABLE INCLINATION ANGLE MICROSCOPE TUBES

[75] Inventor: Masaki Matsubara, Hachiouji, Japan

[73] Assignee: Olympus Optical Co., Ltd., Tokyo, Japan

[21] Appl. No.: 749,427

[22] Filed: Jun. 27, 1985

[30] Foreign Application Priority Data

Jul. 1, 1984 [JP] Japan ................... 59-136028

[51] Int. Cl.$^4$ ............ G02B 21/20; G02B 27/10; G02B 7/18
[52] U.S. Cl. ................... 350/522; 350/145; 350/502; 350/516; 350/539
[58] Field of Search ........ 350/522, 145, 502, 511–516, 350/539, 287, 286, 171, 173

[56] References Cited

U.S. PATENT DOCUMENTS 4,299,439 11/1981 Stromblad ................ 350/522
4,412,727 11/1983 Taira ........................ 350/522

FOREIGN PATENT DOCUMENTS 2654778 6/1978 Fed. Rep. of Germany ...... 350/519

OTHER PUBLICATIONS

Bruce H. Walker, "Pechan Devotation Prism ...", *Opt. Eng.*, Nov.-Dec. 1974, vol. 13, No. 6, pp. G233-234.

*Primary Examiner*—Jon W. Henry
*Attorney, Agent, or Firm*—Cushman, Darby & Cushman

[57] ABSTRACT

An optical system for variable inclination angle microscope tubes, in order to shorten properly the distance between the position of the eye point and focusing handle thereby to improve the operability, comprising a first optical element for bending at right angles the light path of the incident light, a second optical element for bending twice at right angles the light path of the incident light from the first optical element, a third optical element for bending twice at right angles the light path of the incident light from the second optical element and a fourth optical element arranged to bend at right angles the light path of the incident light from the third optical element and then direct it in the same direction as of the incident light upon the first optical element, the third optical element being mounted rotatably around the optical axis of the incident light upon it and the fourth optical element being so mounted as to be able to rotate by an angle twice as large as the angle of rotation of the third optical element interlocking with the rotation of the third optical element around the optical axis of the incident light upon it. Instead of the third and fourth optical elements may be arranged a prism for bending at the right angles the light path of the incident light from the second optical element and then directing it in the same direction as of the incident light upon said first optical element. In this case, the second optical element prism are rotated integrally around the optical axis of the incident light from the first optical element and the prism is further rotated by an angle twice as large as the angle of rotation of the second optical element around the optical axis of the incident light upon it.

14 Claims, 6 Drawing Figures

OPTICAL SYSTEM FOR VARIABLE INCLINATION ANGLE MICROSCOPE TUBES

BACKGROUND OF THE INVENTION a. Field of the Invention

This invention relates to an optical system for microscope tubes.

b. Description of the Prior Art

A microscope so formed that the inclination angle of an observing tube may be variable is already known, for example, from U.S. Pat. No. 4,299,439 and others. In such known system, as optical elements are arranged in a plane cutting the microscope by extending forward and rearward so as to vary the inclination angle of the tube, the separating distance between the position of the eye point of the eyepiece and the optical axis of the objective will be so large that there has been a problem in the operation that, in the case of operating the focusing handle, the hand must be extended greatly.

SUMMARY OF THE INVENTION

In view of the above mentioned circumstances, a primary object of the present invention is to provide an optical system for variable inclination angle microscope tubes wherein, in order to improve the operability, the distance between the position of the eye point and focusing handle can be made properly short.

According to the present invention, the above mentioned object is attained by a variable inclination angle tube optical system including a first optical element for bending at right angles the light path of the incident light, a second optical element for bending twice at right angles the light path of the incident light from the first optical element, a third optical element for bending twice at right angles the light path of the incident light from the second optical element and a fourth optical element arranged so as to bend the light path of the incident light from the third optical element and to direct it in the same direction as of the incident light upon the first optical element, the third optical element being mounted rotatably around its incident light axis and the fourth optical element interlocked with the third optical element being mounted rotatably by twice the rotation angle of the third optical element around its incident light axis.

According to a preferred formation of the present invention, relay lenses for relaying an image is arranged between the optical elements.

According to the present invention, there can be provided this kind of microscope which can be so formed that, even if the inclination angle of the tube is varied, not only the posture of the image within the visual field will not vary and will be kept always stationary but also the separating distance between the position of the eye point and the focusing handle will be of a proper value, is therefore so high in the operability as to remarkably reduce the fatigue of the operator and is particularly adapted to observation for a long time. Also there can be provided a microscope wherein the position of the eye point can be adjusted so precisely and easily that the freedom of fitting the attachment is high.

This and other objects of the present invention will become more apparent during the course of the following detailed description and appended claims.

DESCRIPTION OF THE PREFERRED EMBODIMENTS

Figure 1:
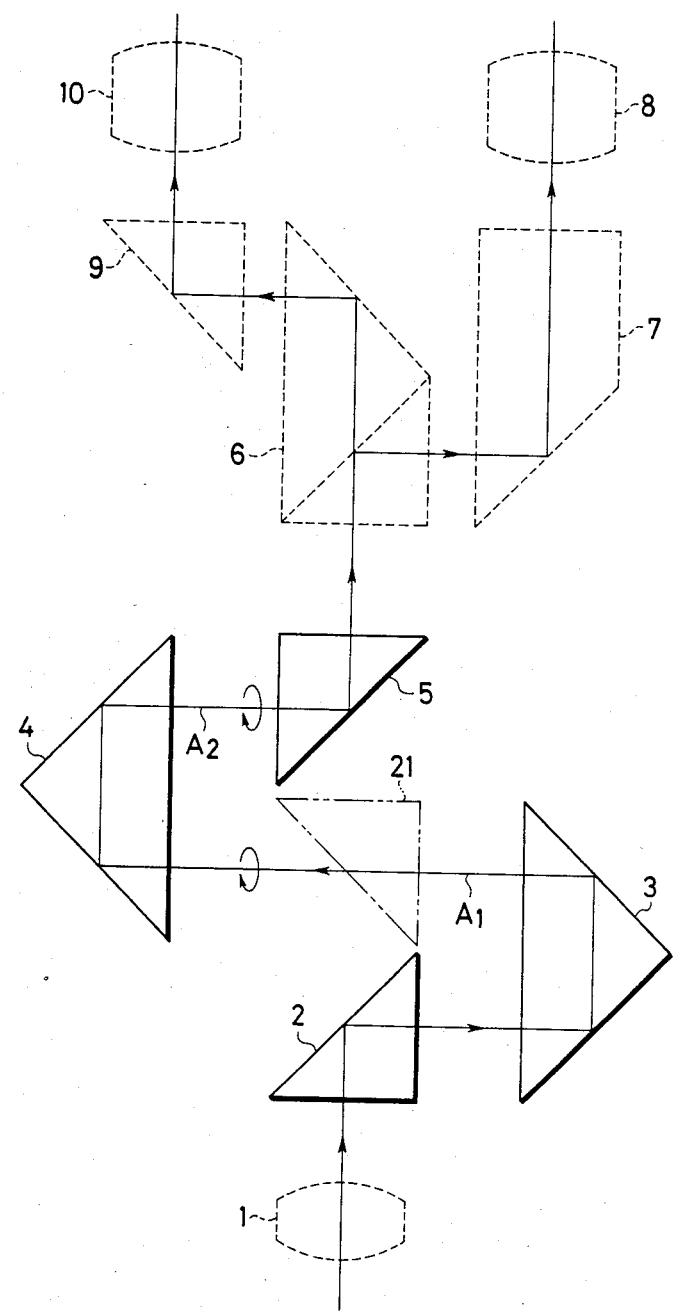
FIG. 1 is a formation view showing an embodiment of the optical system for variable inclination angle microscope tubes according to the present invention.

The present invention shall be concretely explained in the following on the basis of the illustrated embodiments. In FIG. 1, the reference numeral 1 represents an objective, 2 represents a prism as a first optical element for bending at right angles the light path of the incident light having passed the objective 1, 3 represents a prism as a second optical element arranged on the side of the prism 2 and capable of bending twice at right angles the light path of the incident light from the prism 2 and emitting the light parallelly with the incident light in the direction reverse to it in a position in which the optical axis is displaced, 4 represents a prism as a third optical element arranged to partly face the prism 3 and mounted so as to be capable of bending twice at right angles the light path of the incident light from the prism 3, emitting the light parallelly with the incident light in the direction reverse to it in a position in which the optical axis is displaced and being rotated around the incident light axis $A_1$, 5 represents a prism as a fourth optical element arranged to be opposed to the prism 2 and to bend at right angles the light path of the incident light from the prism 4 and direct it in the same direction as of the incident light upon the prism 2 and mounted so as to be rotatable around the incident light axis $A_2$, 6 represents a light pencil dividing prism for dividing the incident light from the prism 5 in a left eye view light pencil and right eye view light pencil, 7 represents a prism for bending at right angles the left eye view light pencil, 8 represents an eyepiece, 9 represents a prism for bending at right angles the right eye view light pencil and 10 represents an eyepiece. In this case, the prisms 2, 3, 4 and 5 are arranged in a plane extending in the horizontal direction of the front surface of the microscope body and the arrangement of the prisms 2 and 3 and arrangement of the prisms 4 and 5 are symmetrical with each other with the incident light axis $A_1$ as an axis of symmetry. The light pencil dividing prism 6 and the prisms 7 and 9 form well known binocular tubes and are so formed that, when the inclination angle of these binocular tubes is varied, while the prisms 4 and 5 rotate integrally around the incident light axis $A_1$, the prism 5 will be further rotated by an angle twice as large around the incident light axis $A_2$.

As this embodiment is formed as mentioned above, the light having passed the objective 1 will proceed as indicated by the arrows through the eyepieces 8 and 9 and the object image will be observed. In this case, the image will be observed through an even number of reflections and therefore the initial posture of the image will be reserved as it is. In case the inclination angle of the binocular tubes is varied interlocking with them, the prisms 4 and 5 will rotate by the same angle as of the tubes around the incident light axis $A_1$, at the same time, the prism 5 will rotate in the same direction by an angle twice as large as the angle of rotation of the prism 4 around the incident light axis $A_2$ and therefore the image within the visual field will remain stationary.

Figure 2:
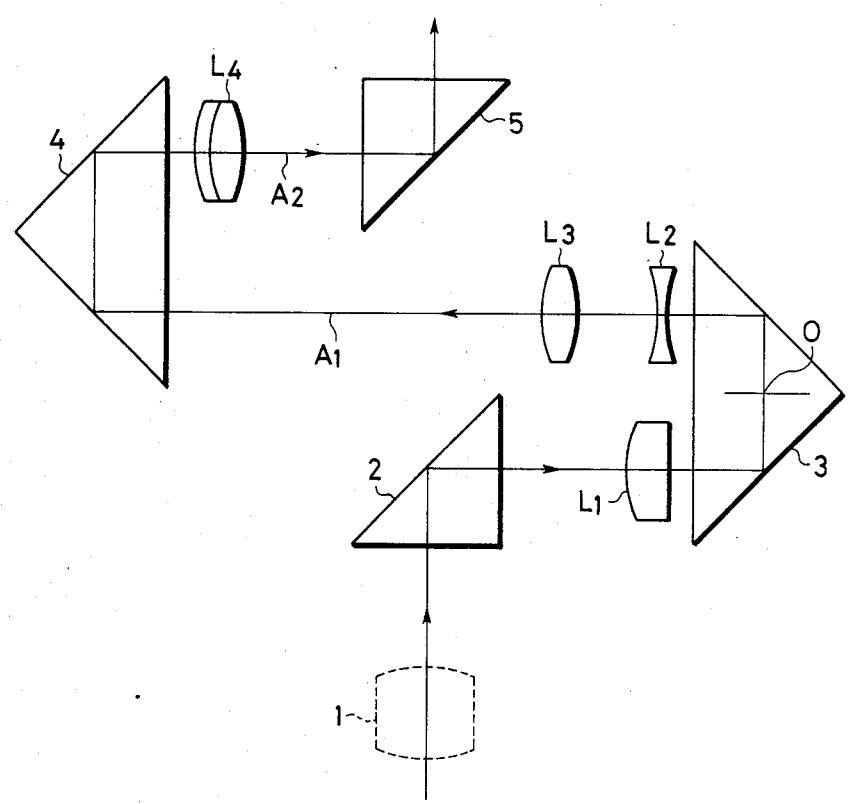
FIG. 2 is a formation view of an essential part showing another embodiment of the optical system for variable inclination angle microscope tubes according to the present invention.

FIG. 2 shows an embodiment wherein relay lenses are arranged between the respective prisms to transmit the image. In the drawing, reference symbol $L_1$ represents a convex lens arranged between the prisms 2 and 3 and for forming the intermediate image of the objective 1 in a position O within the prism 3, $L_2$ and $L_3$ represent respectively a concave lens and convex lens arranged between the prisms 3 and 4 and $L_4$ represents a cemented convex lens arranged betwen the prisms 4 and 5 so that the intermediate image formed in the position O will be relayed by these lenses to the front side focus positions of the eyepieces 8 and 10. In this case, too, the same as in the case of the already described embodiment, even if the inclination angle of the tubes is varied, the image within the visual field will remain stationary and its posture will not vary but the image within the visual field will be an upright image and will be more convenient. By the way, in this case, the magnification of the relay lenses will be $1\times$. As in this embodiment, making it possible to observe the image within the visual field as an erecting image by forming the image once intermediately in the optical system will be indispensable particularly in case the microscope is used to recognize patterns in the semiconductor industrial field but, in case the image within the visual field may be an inverted image, the relay lenses may be arranged to relay the object image without forming it intermediately.

Figure 3:
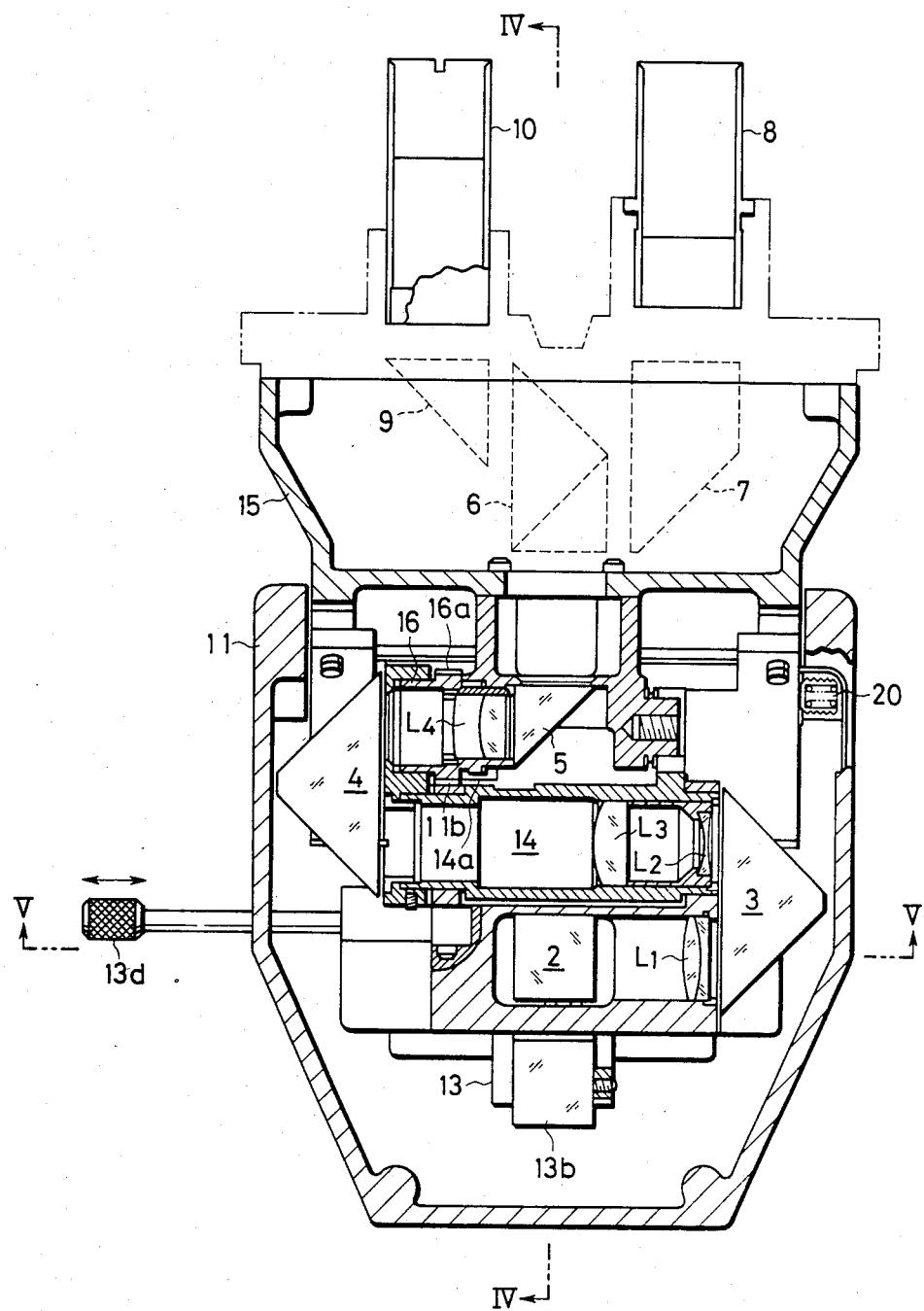
FIG. 3 is a sectioned view showing an example of prism rotating and interlocking mechanism adapted to the embodiment shown in FIG. 2.
Figure 4:
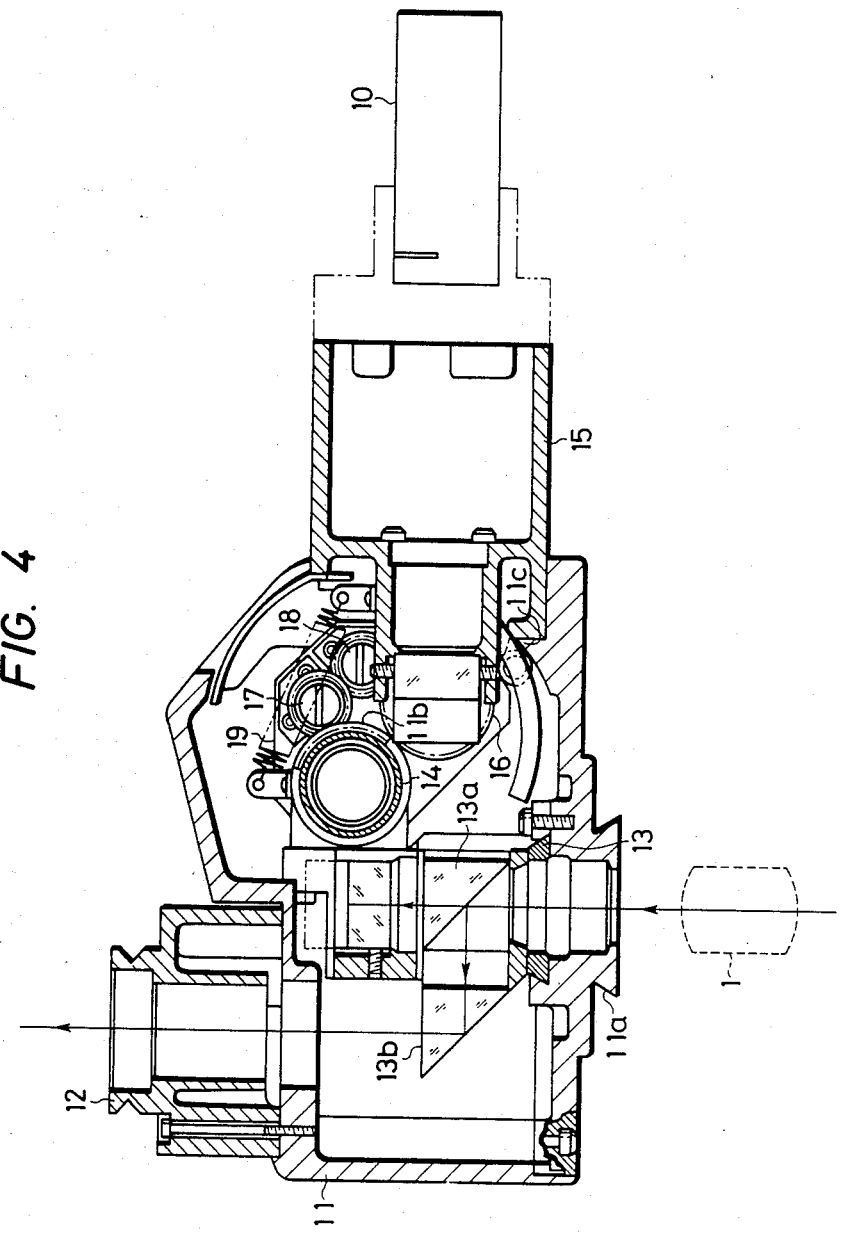
FIG. 4 is a sectioned view on line IV—IV in FIG. 3.
Figure 5:
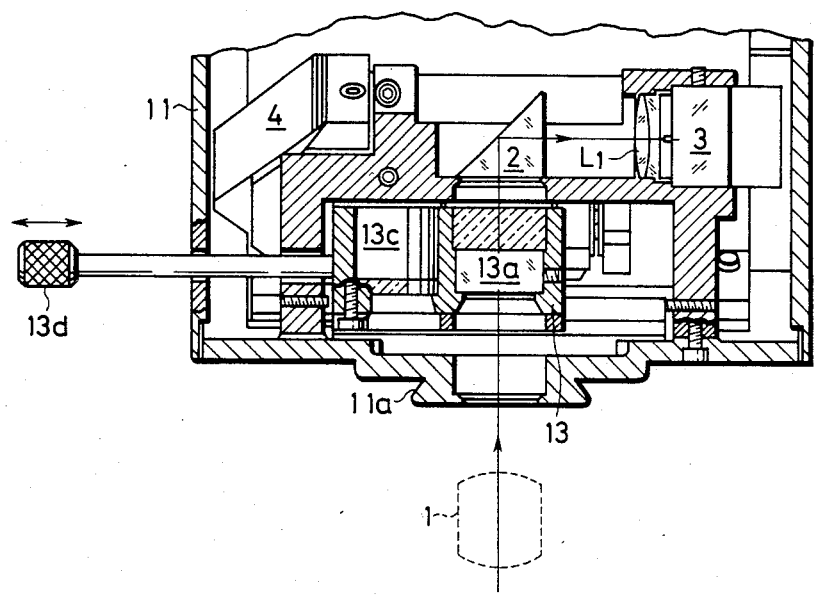
FIG. 5 is a sectioned view of an essential part on line V—V in FIG. 3.

The case of applying an example of such rotating and interlocking mechanism of the prisms 4 and 5 as is described above to the embodiment of FIG. 2 shall be explained in the following with reference to FIGS. 3 to 5. In the drawings, the reference numeral 11 represents a microscope tube supporting frame supporting the prism 2, lens $L_1$ and prism 3 and removably fitting them to a microscope body not illustrated through a fitting part 11a, 12 represents a photographing adaptor fitted to the microscope tube supporting frame 11, 13 represents a switching member fitted slidably in the directions indicated by the arrows as shown in FIGS. 3 and 5 and having a half prism or half mirror 13a and prism 13b for leading the light having passed the objective 1 to the prism 2 and photographing optical system and a cover glass fitted through hole 13c and switching operation grip 13d for leading the same light only to the prism 2 by switching, 14 represents a rotary cylinder supported rotatably by the tube supporting frame 11 and fitted with the lenses $L_2$ and $L_3$ within, 15 represents a tube frame supporting the prism 4 and mounted on the tube supporting frame 11 so as to be rotatable integrally with the rotary cylinder 14, 16 represents a rotary lens frame mounted rotatably on the tube frame 15, having a gear part 16a on the outer peripheral surface and the lens $L_4$ within and having the prism 5 secured at the end, 17 represents an intermediate gear borne rotatably on the tube frame 15 and meshed with a gear part 11b formed on the outer peripheral surface of the supporting frame 11 concentric with the rotary cylinder 14, 18 represents an intermediate gear borne rotatably on the tube frame 15, meshed with the intermediate gear 17 and gear part 16a of the rotary lens frame 16 and having the same number of teeth as of the intermediate gear 17, 19 represents a spring stretched between the tube supporting frame 11 and tube frame 15 and 20 (FIG. 3) represents a spring fitted screw screwd to the supporting frame 11 and pressing the tube frame 15 against on the side wall so as not to move accidentally. According to this rotating and interlocking mechanism, during the observation through the eyepieces 8 and 10, if the microscope tube is rotated, for example, counterclockwise from the position in FIG. 4, the tube frame 15 will rotate counterclockwise around its center axis together with the rotary cylinder 14 but, in such case, the intermediate gear 17 will rotate while revolving counterclockwise around the same center axis. Therefore, the intermediate gear 18 will rotate clockwise while revolving counterclockwise around the same center axis. As a result, the rotary tube frame 16 will also rotate counterclockwise while revolving counterclockwise around the same center axis. Thus, while the lenses $L_2$ and $L_3$, prism 4, lens $L_4$ and prism 5 are rotating counterclockwise integrally with the tube frame 15 around the center axis of the rotary cylinder 14, the lens $L_4$ and prism 5 will be further rotated counterclockwise by an angle twice as large around the center axis of the rotary tube frame 16. In this case, the tube frame 15 will be supported in the lower part by the supporting part 11c (FIG. 4) of the supporting frame 11, the tube frame 15 will be held as suspended by the spring 19 and therefore the tube will be stably maintained in the position together with the pressing action of the screw 20 against the tube frame 15.

· Each of the above mentioned embodiments has been explained as provided with the binocular tubes but it is needless to say that the present optical system can be applied also to a microscope provided with a single observation tube. Also, the prism 2 may form an optical system as rotated by 90 degrees from the illustrated position so that the incident light from the objective 1 may be vertically incident upon the paper surface from the back side. In such case, it will be necessary to arrange the prism 5 also as rotated by 90 degrees. Further, mirrors can be used instead of the prisms as the first to fourth optical elements. The arrangement of the lenses is not limited to the embodiment but can be varied.

Figure 6:
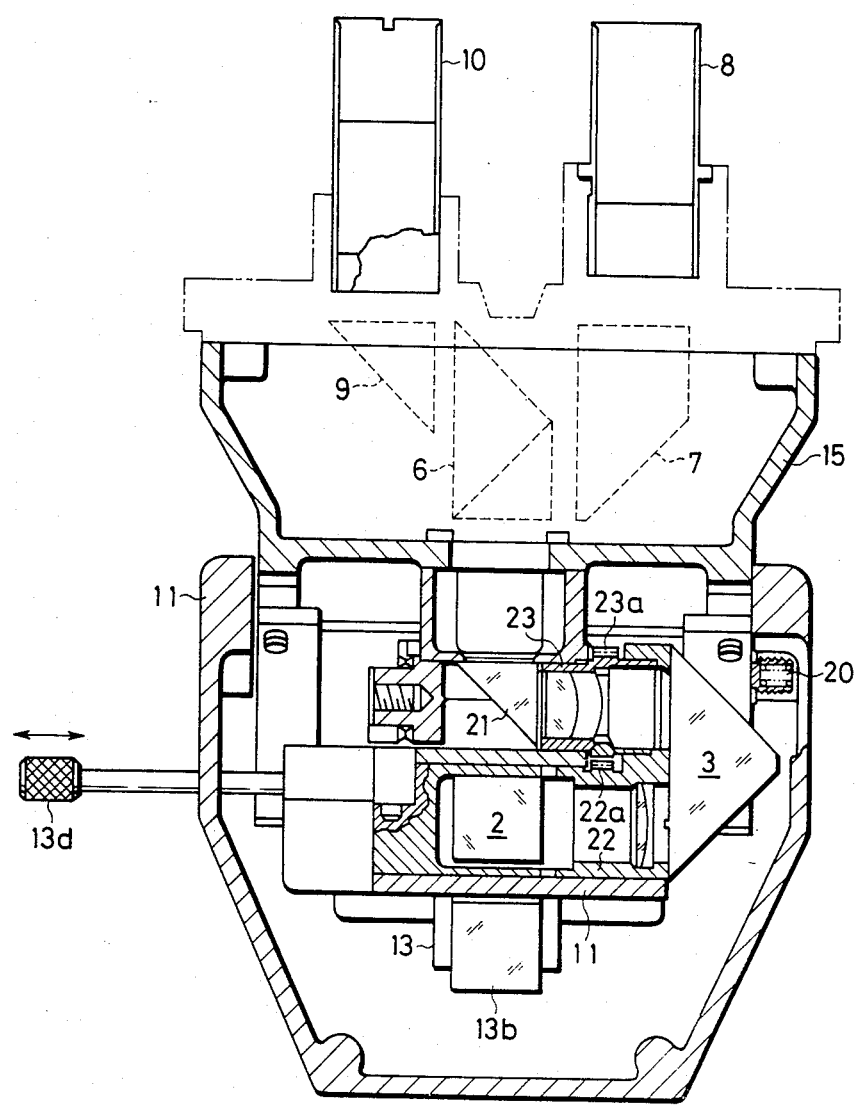
FIG. 6 is a sectioned view showing an example of prism rotating and interlocking mechanism adapted to another embodiment shown by the chain lines in FIG. 1.

Further, in the present optical system as shown by the chain lines in FIG. 1, instead of the prism 4 which is the third optical element and the prism 5 which is the fourth optical element, a prism 21 for bending at right angles the light path of the incident light from the second optical element 3 and directing it in the same direction as of the incident light upon the first optical element may be provided to attain the same object. In this case, it will be necessary to further rotate the prism 21 by an angle twice as large around the optical axis $A_1$ while integrally rotating the prisms 3 and 21 around the emitted light axis from the prism 2 toward the prism 3. FIG. 6 shows the rotating and interlocking mechanism for the prism 3 and 21 constituted so as to fit this embodiment. That is, on the microscope tube supporting frame 11 is mounted rotatably a rotary cylinder 22 which is rotated concentrically and integrally with the tube frame 15 and supports the prism 3 on its end face, on the rotary cylinder 22 is mounted rotatably a rotary lens frame 23 having a gear part 23a on the outer peripheral surface, a relay lens within and the prism 21 secured at the end, and the gear part 23a is connected to a gear part 22a formed on the outer peripheral surface of the rotary cylinder 22 through a pair of intermediate gears arranged in the same manner as the intermediate gears 17 and 18 shown in FIG. 4. Accordingly, when the tube frame 15 is rotated around its center axis together with the rotary cylinder 22, the prism 3 will rotate integrally with the rotary cylinder, and the rotary lens frame 23 will be rotated by an angle twice as large around its center axis while revolving around the rotary axis of the rotary tube frame 15. As the formation and operation of the other parts of the mechanism shown in FIG. 6 are same as those of the already described embodiment, the further detailed explanation is omitted. According to this embodiment, there is a further advantage that the entire device can be more simplified.

It is needless to say that such modification also falls under the scope of the present invention.

What is claimed is:

1. An optical system for variable inclination angle microscope tubes comprising a supporting frame, a first optical element secured on said supporting frame and for bending at right angles the light path of the incident light, a second optical element secured on said supporting frame and for bending twice at right angles the light path of the incident light from said first optical element, a tube frame rotatably mounted on said supporting frame, a third optical element secured on said tube frame and for bending at right angles the light path of the incident light from said second optical element and a fourth optical element rotatably mounted on said tube frame so as to be able to rotate by an angle twice as large as the angle of rotation of said tube frame interlocking with the rotation of said tube frame and for bending at right angles the light path of the incident light from said third optical element and then directing it in the same direction as of the incident light upon said first optical element, a rotary axis of said tube frame coinciding with the optical axis of the incident light upon said third optical element, and a rotary axis of said fourth optical element coinciding with the optical axis of the incident light upon said fourth optical element.

2. An optical system for variable inclination angle microscope tubes according to claim 1 further comprising relay lenses arranged respectively between said first, second, third and fourth optical elements.

3. An optical system for variable inclination angle microscope tubes according to claim 1 wherein each of said first, second, third and fourth optical elements is a prism.

4. An optical system for variable inclination angle microscope tubes according to claim 1 further comprising a light dividing prism secured to said tube frame and dividing the light path of the incident light from said fourth optical element into two light paths, a prism secured to said tube frame and for leading one of the light paths divided by said light dividing prism to one eyepiece optical system and a prism secured to said tube frame and for leading the other of the light paths divided by said light dividing prism to the other eyepiece optical system.

5. An optical system for variable inclination angle microscope tubes according to claim 1 further comprising a spring connected between said supporting frame and tube frame and a screw screwed to said supporting frame and resiliently pressing a part of said tube frame with a predetermined force to prevent said tube frame from accidentally moving, said tube frame being maintained in an angular position adjusted with respect to said supporting frame by the cooperative action of said spring with the screw.

6. An optical system for variable inclination angle microscope tubes according to claim 1 further comprising a switching member mounted slidably on said supporting frame and provided with an optical member capable of leading to a photographing optical system a part of the light to be incident upon said first optical element, the light being led only to said first optical element when said switching member is moved to a first position and being lead to said first optical element and photographing optical system when said switching member is moved to a second position.

7. An optical system for variable inclination angle microscope tubes comprising a supporting frame, a first optical element secured on said supporting frame and for bending only once the light path of the incident light, a tube frame rotatably mounted on said supporting frame, a second optical element secured on said tube frame and for bending only twice the incident light from said first optical element to emit the light in parallel with the direction of the incident light, a third optical element rotatably mounted on said tube frame so as to be able to rotate by an angle twice as large as the angle of rotation of said tube frame interlocking with the rotation of said tube frame and for bending at right angles the light path of the incident light from said second optical element, a rotary axis of said tube frame coinciding with the optical axis of the incident light upon said second optical element, and a rotary axis of said third optical element coinciding with the optical axis of the incident light upon said third optical element.

8. An optical system for variable inclination angle microscope tubes according to claim 7 wherein each of said first optical element and said second optical element bends at right angles the light path of the incident light thereupon.

9. An optical system for variable inclination angle microscope tubes according to claim 7 wherein the direction of the light emitted from said third optical element is in the same plane as that of the incident light upon said first optical element.

10. An optical system for variable inclination angle microscope tubes comprising a supporting frame, a first optical element secured on said supporting frame and for bending the light path of the incident light, a second optical element secured on said supporting frame and for bending twice the incident light from said first optical element, a tube frame rotatably mounted on said supporting frame, a third optical element secured on said tube frame and for bending twice the incident light from said second optical element to emit the light in parallel with the direction of the incident light and a fourth optical element rotatably mounted on said tube frame so as to be able to rotate by an angle twice as large as the angle of rotation of said tube frame interlocking with the rotation of said tube frame and for bending at right angles the light path of the incident light from said third optical element, a rotary axis of said tube frame coinciding with the optical axis of the incident light upon said third optical element, and a rotary axis of said fourth optical element coinciding with the optical axis of the incident light upon said fourth optical element.

11. An optical system for variable inclination angle microscope tubes according to claim 10 wherein each of said first optical element, said second optical element and said third optical element bends at right angles the light path of the incident light thereupon.

12. An optical system for variable inclination angle microscope tubes according to claim 11 further comprising relay lenses arranged respectively between said first, second, third and fourth optical elements.

13. An optical system for variable inclination angle microscope tubes according to claim 10 wherein the direction of the light emitted from said fourth optical element is in the same plane as that of the incident light upon said first optical element.

14. An optical system for variable inclination angle microscope tubes according to claim 13 further comprising relay lenses arranged respectively between said first, second, third and fourth optical elements.

* * * * *